Patented Nov. 1, 1949

2,486,384

UNITED STATES PATENT OFFICE 2,486,384

TREATMENT OF OIL-BEARING VEGETABLE MATERIALS FOR RECOVERY OF OIL

John W. Beckman, Oakland, Calif., assignor to Marian O. Palmer, Oakland, Calif.

No Drawing. Application April 28, 1947, Serial No. 744,513

1 Claim. (Cl. 195—3)

This invention relates to improvements in processes for the recovery of oil from cellular oil-bearing materials, animal or vegetable in origin, and to the products of the processes.

Within the specification and claims, I use the term "esterase" to include such enzymes (lipase, butyrase) as have the ability to hydrolyze fats and oils. I use the term "fat" to include not only solid fats specifically but oils and like materials. The distinction is that "fat" is generic while "oil" means liquid fat, but the terms are used interchangeably. All the temperatures are in degrees centigrade. Acid value 1 equals 0.503% free fatty acid determined as oleic acid. The term "materials" includes those set forth above. By vegetable I mean life other than animal.

An object of the invention is to recover oil from such materials in a more expeditious and efficient manner while avoiding or minimizing deterioration of other organic components of the materials.

A further object is to recover fats and oils from such materials without substantially deteriorating the fats and oils in the process.

A specific object is to so treat the material that the oil content is readily recoverable therefrom in a high state of purity.

A further specific object is to produce an oil or fat having improved characteristics as to acidity, odor, flavor, purity, etc.

In the organic materials with which I am concerned, the oil is commonly contained in cells which are part of the structure of the materials. In order to recover the oil, it is necessary to release the oil from the cell in some manner, for example, by breaking the cell wall.

One of the manners in which the oil may be released is by means of enzymatic or bacterial reactions on the cell structure, whatever its chemical nature.

It is unfortunate but nevertheless a fact that such materials in addition to the oil contain enzymes or other agents capable of degrading the oil at an increased rate after the cell is opened, particularly by splitting the fats or oils to yield free fatty acids and glycerol. The free fatty acids are an unwanted component of the oil ordinarily and the excessive content of such acids in the oil may render it unfit for certain uses, or decrease its quality.

One of the objectionable aspects of known enzymatic or fermentation processes is that not only may the enzymes or microorganisms react upon the cell structure but during the same time enzymes capable of splitting the fat and producing fatty acids are in an environment which is favorable for their action. Therefore, one of the results of such a process is that the oil produced has a relatively high acid value, higher than that of the source material at the beginning of processing for oil recovery.

It is, of course, known that heat will inactivate enzymes, both esterases and proteases, along with other types. If then it were possible to inactivate all enzymes and thereafter add to the mass only a pure active agent desired for breaking down the cell structure, possibly the oil could be recovered without objectionable deterioration. However, heating to such an extent, in addition to inactivating the enzymes, causes coagulation of the proteins which thereafter resist the agent upon which the enzymatic or fermentation process depends, and adversely affects the oil. The end result then would be that the time of incubation would be vastly increased and the time therefore during which the fat was subject to deterioration will be greater. Such considerations therefore make a complete inactivation of enzymes not only undesirable but an infeasible process.

I have discovered, however, that a short period of heating at a temperature sufficient to inactivate the fat hydrolyzing enzymes but insufficient to cause coagulation of proteins, will have a number of beneficial results.

First, the oil-containing material may thereafter be processed at a temperature which would be favorable to the fat-hydrolyzing enzymes without actual deterioration of the oil, due to the inactivation of such enzymes.

Second, since the proteins are not coagulated, opening of the cell walls by means of the action of enzymes or microorganisms is greatly facilitated and release of the oil will come about in a reduced time and in increased quantity.

In general my process involves first comminuting the oil-bearing material such as coconut, peanuts, cottonseed, meats, fish, etc., in such a manner regarding cleanliness, etc., as to produce highly edible oils. I then heat the material quickly to a predetermined temperature between 50° and 72° C. in order to inactivate certain enzymes. The material is left at these temperatures for a time insufficient to cause coagulation of the proteins of the material. I then cool the material quickly, as by adding it to water at a lower temperature, and subject it to an incubation for breaking the cell walls and releasing the oil. In case added water is not needed for incubation, other means for cooling may be used, e. g., vacuum. Following inactivation of the fat hydrolyzing enzymes, the rest of the process will be similar to known processes.

The process just described will result in an increased yield of oil from a given mass of material, this oil having a lower acid value as compared to oil released from the same material by a process not including the step of inactivating the enzymes.

As a specific example, for the purpose of comparing the new process with the old, I used coconut meat having an analyzed oil content of 23%, the acid value of which oil was 12.1. The coconut meat was comminuted to a size no substantial portion of which passed 1/16 inch mesh screen. The whole mass was then divided into two batches of 1000 lbs. each.

To the first portion I added a culture obtained from brewer's malt (by incubating a suspension of malt in water), one pound of calcium carbonate and a sufficient amount of water to make the entire mixture of a mush-like consistency. The mixture was then incubated at a temperature of 49° C. for a period of 125 hours. Tests then indicated that all the recoverable oil had been released. Oil recovered from this batch amounted to 212 lbs., the acid value of which was 23.2.

The second batch was treated in exactly the same manner except that prior to incubation, it was heated quickly to 70° C. by means of an electronic high frequency heater, maintained at that temperature for a period of five minutes, and then cooled by the mixture of the material with the water necessary for the subsequent step of incubation. Incubation required only 100 hours. The oil recovered from this batch was 225 lbs. and the acid value was 14.1. Increased yield and quality are apparent.

Various source materials will differ in many respects. For example, I have recovered peanut oil by a like process wherein the incubation time is only 24 hours. I have also recovered olive oil in 24 hours, at above 98% yield of oil having an acid value of 0.8.

It is not to be understood that the step of inactivating the fat hydrolyzing enzymes is useful only in connection with the process where the oil is released by means of an enzymatic or fermentation step. On the contrary, it may be employed where the oil is recovered from the material, following the inactivation step by means of, for example, a solvent process wherein the cell walls may or may not be ruptured, and improved results will be attained. The important thing is to inactivate the fat hydrolyzing enzymes without substantially coagulating the proteins.

While I have above indicated the heating of material following comminution, this is merely because the comminuted material is usually more uniform and easier to handle than is the material prior to comminution. However such a sequence of steps is not vital to the success of the operation and the heating may be substantially the first step in the treatment of the process. This is possible due to the fact that the only heating methods which I have found capable of use in this process are internal resistance, electronic, or dielectric heating. No other methods which I have tried will result in raising the temperature to the desired degree in the short time and throughout the whole of the material nor are they controllable to such a degree as to render them useful. I may preheat to a temperature below that at which any protein coagulation can occur, by other means.

Thus while the actual mode of heating is actually of no importance in the process, resistance, dielectric or electronic heating are the most useful types. Efforts to accomplish the end result by external heating means have indicated that such methods of heating failed to heat the material uniformly throughout its mass, resulting in an undesirable degree of protein coagulation in portions overheated, and causing scorching which may give rise to bad odors or flavors in the oil recovered. In a factory operation, I am able to pass the material on a suitable conveyor moving at a uniform rate of speed so that the material is within the heating range of the coils or plates of a dielectric machine, for example, for approximately fifteen seconds to five minutes, depending on such factors as density, volume, homogeneity, specific heat, dielectric constant, power factor, etc. At the end of the conveyor and immediately following the heating unit, the material is dumped into a tank of water at lower temperature such that the mixture will be at a temperature suitable for incubation, say 42° C. to 50° C.

While it is not possible to be exact in specifying the temperatures at which various esterases in various materials will always be 100% inactivated, I have found that the temperature ranges I disclose are useful in that later enzymatic action on the fat is demonstrably unsubstantial. It will be noted that the range of temperatures used in the incubation process overlaps the range used for inactivation of the enzymes. It will further be noted that the higher temperatures used for inactivating the enzymes go into the temperature range where coagulation of proteins may occur if long continued. However, the first range does not overlap the third range and proteins are not coagulated at the incubation temperatures. The time during which the material is exposed to a temperature for inactivating the fat hydrolyzing enzymes does not result in an appreciable amount of protein coagulation or oil deterioration.

I have referred to the incubation as for an enzymatic action. This may rather be termed a fermentation. The essential is that the oil be released from the cell. I may add any necessary materials for facilitating the process of incubation.

It will be advantageous to avoid fat hydrolysis in any process for recovery of the fat content, since an improved product will be obtained. In other words, it is not important how the oil is released from the cells, but is important that the oil not be subjected to the action of hydrolyzing enzymes after it has been so released and is in contact with other cell material and with moisture.

One of the advantages of the improved process is that it is now worth while to secure better source material. In prior processes, deterioration of the oil was relatively so great in the recovery steps that there was little point in insistence on a source material low in acid. The practical result of this was that even so-called "edible" oils are commonly produced from filthy and verminous source materials, which necessitates various steps of cleaning to disguise the taste and odor. The difference between my product and that of the prior art corresponds to the difference between first grade butter and reprocessed butterfat.

I claim:

A process for recovering fats from cellular organic materials consisting in comminuting the material, heating the comminuted material at from 50° C. to 72° C. for from 15 seconds to five minutes to inactivate fat-hydrolyzing enzymes, then cooling to below 50° C., subjecting the cooled material to enzymatic protein degradation for from 60 to 100 hours, and recovering the fat.

JOHN W. BECKMAN.

REFERENCES CITED

The following references are of record in the file of this patent:

UNITED STATES PATENTS

| Number | Name | Date |
| --- | --- | --- |
| 1,366,338 | Alexander | Jan. 25, 1921 |
| 1,892,449 | Dengler | Dec. 27, 1932 |
| 1,922,484 | Mapson et al. | Aug. 15, 1933 |

OTHER REFERENCES

Industrial and Engineering Chem., vol. 22, No. 2, p. 117, by Beckman.